(12) United States Patent
Reda et al.

(10) Patent No.: US 6,499,226 B1
(45) Date of Patent: Dec. 31, 2002

(54) MEASURING TAPE

(75) Inventors: Joe Reda, Enfield, CT (US); Joe DeCarolis, Bristol, CT (US)

(73) Assignee: The Stanley Works, New Britain, CT (US)

( * ) Notice: Subject to any disclaimer, the term of this patent is extended or adjusted under 35 U.S.C. 154(b) by 78 days.

(21) Appl. No.: 09/635,396

(22) Filed: Aug. 10, 2000

(Under 37 CFR 1.47)

(51) Int. Cl.$^7$ .............................. G01B 1/00; G01B 3/10
(52) U.S. Cl. ........................................... 33/771; 33/755
(58) Field of Search .................... 33/771, 755, 757, 33/759, 760

(56) References Cited

U.S. PATENT DOCUMENTS

| | | | |
|---|---|---|---|
| 2,321,920 A | 6/1943 | Keuffel et al. | |
| 2,659,153 A | 11/1953 | Beeber | |
| 2,994,958 A | * 8/1961 | Beeber | ........................ 33/771 |
| 4,459,753 A | 7/1984 | Nagasawa et al. | |
| 5,029,402 A | 7/1991 | Lazecki et al. | |
| 5,095,635 A | 3/1992 | Hassler, Jr. et al. | ........... 33/771 |
| 5,383,285 A | 1/1995 | Takahashi | |
| 5,581,901 A | 12/1996 | Takahashi | |
| 5,895,539 A | 4/1999 | Hsu | |

FOREIGN PATENT DOCUMENTS

| | | | | |
|---|---|---|---|---|
| DE | 3616584 | | 12/1986 | |
| FR | 571 855 | * | 5/1924 | ................... 33/755 |
| GB | 2 076 538 A | * | 12/1981 | ................... 33/755 |
| GB | 2 123 955 A | * | 2/1984 | ................... 33/755 |

* cited by examiner

Primary Examiner—Christopher W. Fulton
(74) Attorney, Agent, or Firm—Pillsbury Winthrop LLP

(57) ABSTRACT

A measuring tape comprises an elongated blade of a plastic material reinforced by a transverse array of longitudinally extending continuous filaments. The array of continuous filaments includes grouped carbon filaments of a volume constituting 0 to 90% of the total volume of filaments, steel filaments of a volume constituting 0 to 90% of the total volume of filaments and fiberglass filaments of a volume constituting 0 to 90% of the total volume of filaments.

44 Claims, 4 Drawing Sheets

MEASURING TAPE

FIELD OF THE INVENTION

The present invention relates generally to long tape measures and more particularly to the composition of the measuring tapes used in long tape measures.

BACKGROUND OF THE INVENTION

Measuring tapes are originally thought of as embodying a symmetrical configuration defined by two parallel faces disposed on opposite sides of a central plane. One of the faces contains measurement markings printed thereon.

There have been many efforts to enhance the measuring effectiveness of measuring tapes by altering their composition so as to reduce tape elongation, or stretching while maintaining tape flexibility. Stretching in measuring tapes leads to erroneous measurements and reduces the accuracy of the tape.

Examples of measuring tapes including composition of inorganic fibers, organic fibers or a combination thereof incorporated within a coating are disclosed in the following patents: U.S. Pat. Nos. 2,321,920, 4,459,753 and 5,095,632; and United Kingdom Patent Application No. 2 123 955 A.

The '920 patent teaches a measuring tape having a woven fabric strip of inorganic material such as glass fibers combined with organic material such as cotton or linen fibers and coated with an impregnating coating. The '955 application is similar in that glass yarn is used to form a longitudinal reinforcement layer and gives dimensional stability to the tape. The '955 application further teaches incorporating glass fibers surrounded by layers of natural or artificial fibers within a polyvinyl chloride (PVC) matrix. Both of these efforts result in a measuring tape that is adequately flexible, however, both lengthen when subjected to stresses during normal operation. Lengthening of the tape leads to erroneous measurements.

The '753 patent is similar to the '920 patent, in that it teaches the use of woven glass fibers are impregnated with thermosetting resin. The '753 patent differs in that it also teaches the use of carbon fibers in the woven structure instead of glass fibers. The '632 patent teaches a structure formed of a plurality of aligned, overlapped, relatively thin and narrow strips of carbon fibers impregnated with thermoplastic resin (polyphenylene sulfide) to have a low coefficient of thermal expansion along the length axis, i.e. it has a very low distortion with respect to thermal expansion.

Applicant has found that the formation of measuring tapes from a glass fiber structure impregnated with resin or a carbon fiber structure impregnated with resin do not achieve desired tape elongation stability characteristics. Moreover, in some applications, measuring tapes are used around work areas containing sharp objects, such as construction sites. Usage in these areas makes it desirable to reduce the blade's ability to be cut by being pulled over a sharp corner or run over by a sharp object. Applicant has also found that such sharp objects frequently cut the measuring tapes formed from a glass fiber structure impregnated with resin or a carbon fiber structure impregnated with resin.

Generally, metal measuring tapes provide a durable construction with a high resistance to being cut by sharp objects. Metal measuring tapes are made from steel, which has a high elastic modulus and exhibits great toughness. Increased modulus corresponds to a proportional decrease in tape elongation and results in more accurate measurements. In addition, steel has a greater toughness than carbon and fiberglass and this difference in mechanical properties allows steel to be significantly more cut resistant than either carbon or fiberglass. However, steel is not a flexible material and tends to keep its shape when kinked. The kinking of the steel reduces the measurement accuracy of the tape, even after the kinks are straightened.

Consequently, there exists a need in the art for a measuring tape that has the advantages of balancing stretch resistance, cut resistance and cost.

SUMMARY OF THE INVENTION

It is an object of the present invention to provide a measuring tape that meets the needs described above. In accordance with the principles of the present invention, this objective is accomplished by providing a measuring tape comprising an elongated blade of a plastic material reinforced by a transverse array of longitudinally extending continuous filaments. The array of continuous filaments includes grouped carbon filaments of a volume constituting 0 to 90% of the total volume of filaments, steel filaments of a volume constituting 0 to 90% of the total volume of filaments and fiberglass filaments grouped in strands of a volume constituting 0 to 90% of the total volume of filaments.

An object of the present invention is also achieved by providing a long tape comprising a casing and a reel member being rotatably mounted within the casing for relative movement thereto. An actuating member accessible on an exterior of the casing for manually moving the reel member relative to the casing and extending through the casing to be received within the reel member rotatably mounted within the casing. A measuring tape is wound around the reel member and has one end thereof extending from the casing configured and arranged to be retractable towards the casing by the actuating member. The measuring tape comprises an elongated blade of a plastic material reinforced by a transverse array of longitudinally extending continuous filaments. The array of continuous filaments includes grouped carbon filaments of a volume constituting 0 to 90% of the total volume of filaments, steel filaments of a volume constituting 0 to 90% of the total volume of filaments and fiberglass filaments grouped in strands of a volume constituting 0 to 90% of the total volume of filaments.

Other objects, features and advantages of the present invention will become apparent from the following detailed description, the accompanying drawings, and the appended claims.

DETAILED DESCRIPTION OF THE PRESENT INVENTION

Figure 1:
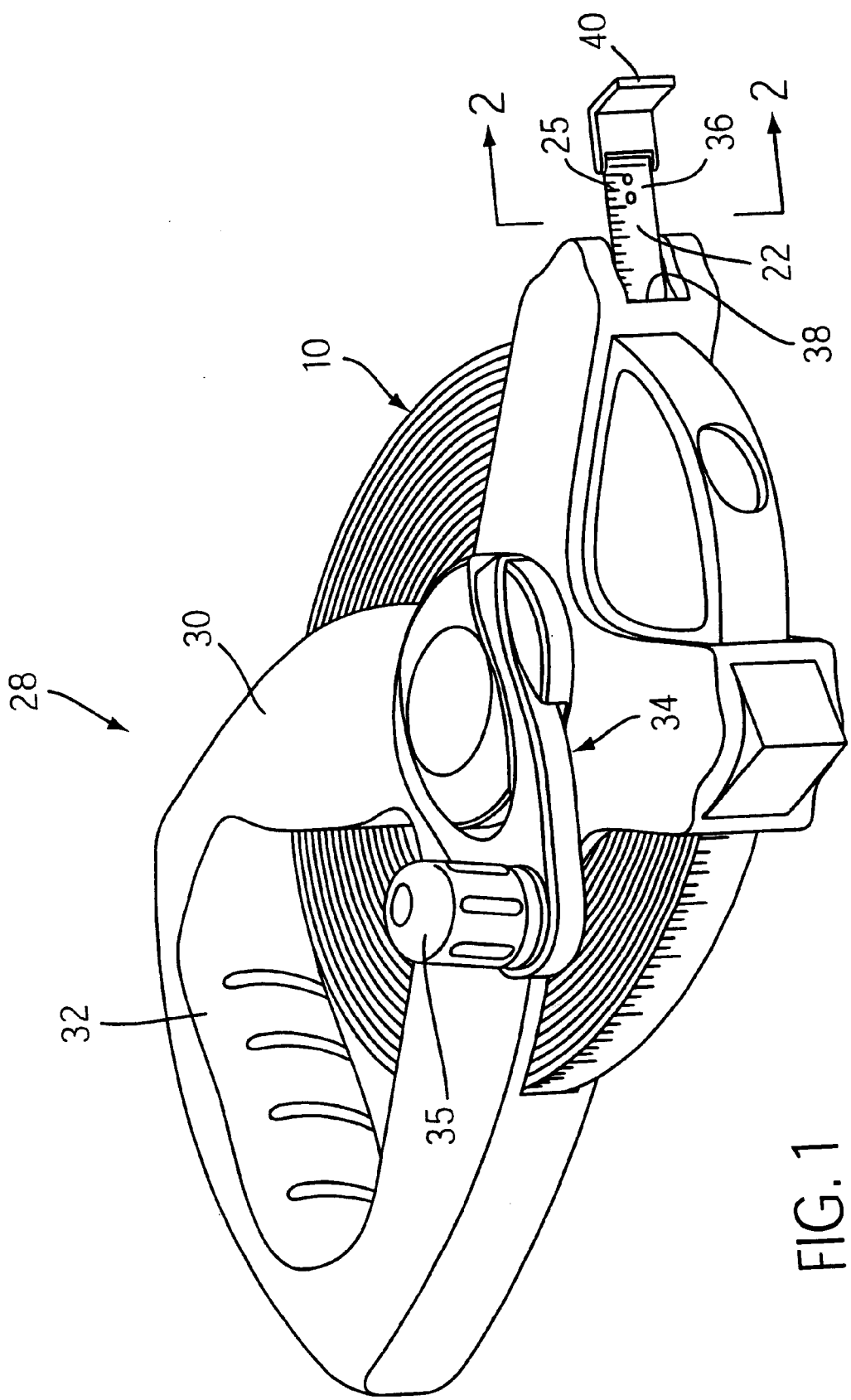
FIG. 1 is a perspective view of a long tape embodying the principles of the present invention.

In the description below, reference numerals for the same elements remain the same in each figure.

Figure 2:
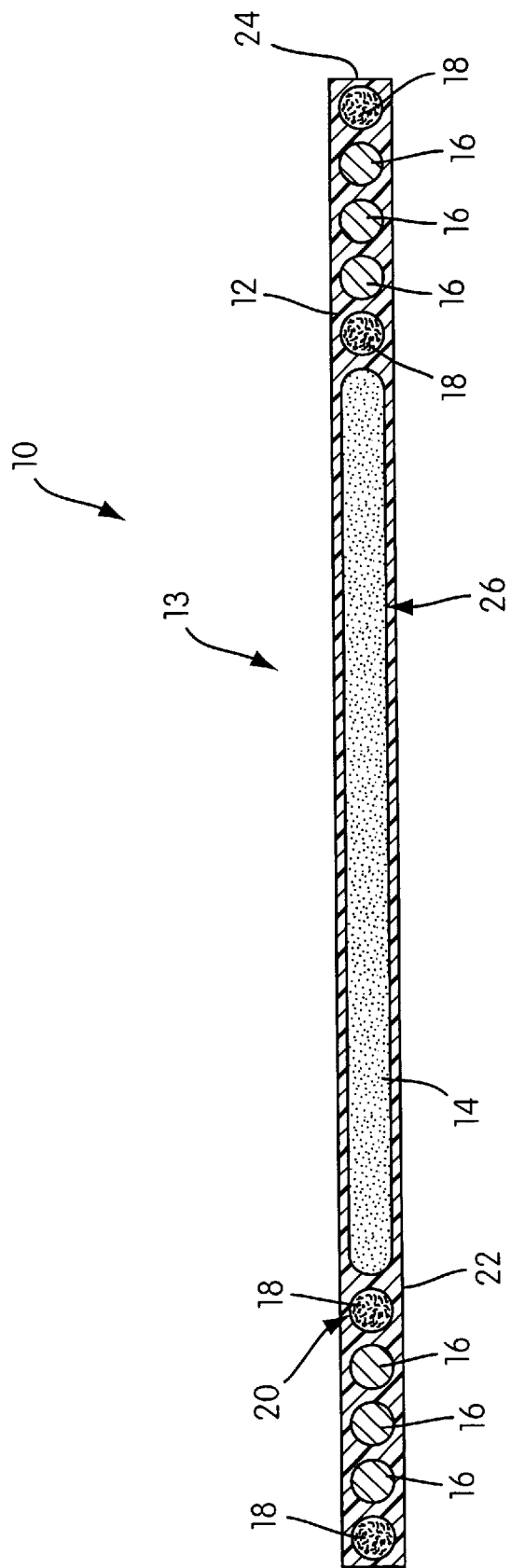
FIG. 2 is a cross section taken along the line 2—2 of FIG. 1 showing the interior composition of the measuring tape.

Referring now more particularly to the drawings, there is shown in FIGS. 1 and 2 thereof a preferred embodiment of a measuring tape, generally indicated at 10, embodying the principles of the present invention. The measuring tape 10 comprises an elongated blade 12 of a plastic material reinforced by a transverse array 13 of longitudinally extending continuous filaments. The array 13 of continuous filaments includes grouped carbon filaments, generally indicated at 14, of a volume constituting 0 to 90% of the total volume of filaments, steel filaments, generally indicated at 16, of a volume constituting 0 to 90% of the total volume of filaments and fiberglass filaments 18 grouped in strands, generally indicated at 20, of a volume constituting 0 to 90% of the total volume of filaments.

The plastic elongated blade 12 provides a pair of longitudinally extending, generally flat side faces 22 spaced apart in parallel relation to define the width of the blade 12. Straight side edges 24 extend between the flat side faces 22 to define a generally rectangular cross section. Measurement markings 25 are printed on the exterior of the transversely extending side faces 22, of which only one of side faces 22 is shown in FIG. 1.

The elongated blade 12 is reinforced by the array 13 of longitudinally extending continuous filaments therein. The array 13 of continuous filaments reinforces the elongated blade 12 by improving the integrity under tension of the blade 12. The elongated blade 12 is a reinforced extrusion of plastic material, for example of a polyvinyl chloride resin (PVC), however, it is contemplated that a wide variety of other plastic materials may be suitable for making the elongated blade 12 to satisfy the desired cost and performance characteristics.

FIG. 2 is a cross sectional view of the measuring tape 10 embodying the principles of the present invention. The scaling of the cross-sectional view is greatly exaggerated in order to more clearly illustrate the principles of the present invention and the array of continuous filaments within the elongated blade 12.

The grouped carbon filaments 14 are slightly twisted together into a single carbon filament flattened bundle 26 having a transversely elongated generally rectangular cross-sectional configuration. The carbon filament flattened bundle 26 is centrally positioned within the elongated blade 12. The steel filaments 16 are transversely spaced on opposite sides of the carbon filament flattened bundle 26. The fiberglass strands 20 are disposed in equal number on opposite sides of both the carbon filament flattened bundle 26 and the steel filaments 16. As shown in FIG. 2, three steel filaments 16 are disposed on opposite sides of the carbon filament flattened bundle 26 and two fiberglass strands 20 are disposed on opposite sides of the three steel filaments 16.

In array 13, all of the grouped carbon filaments 14, the steel filaments 16 and the filaments 18 are transversely symmetrical.

When the carbon filaments 14 are twisted together into the carbon filament flattened bundle 26, a void (not shown) is created in the volume of the carbon filament flattened bundle 26 such that the volume of carbon filaments 14 is of a volume constituting about 70% of the total volume occupied by the carbon filament flattened bundle 26. In other words, the total volume of the carbon filament flattened bundle 26 is greater than the volume occupied by the grouped carbon filaments 14 therein. Preferably, the carbon filament flattened bundle 26 includes about 12,000 slightly twisted carbon filaments 14 flattened to a height of approximately 0.010 inches.

The carbon filament flattened bundle 26 may comprise any number or percentage of carbon filaments 14 whereby the total number of carbon filaments 14 equals a percentage constituting 0 to 90% of the total volume of filaments in the array 13.

Preferably, the array 13 includes grouped carbon filaments 14 of a volume constituting 60 to 75% of the total volume of filaments, with carbon filaments 14 of a volume constituting 65% of the total volume of filaments being the most preferred.

Each steel filament 16 in the form of a wire has a generally circular cross-sectional configuration. Each steel filament 16 has a diameter of approximately 0.010 inches, which is generally equal to the height of the carbon filament flattened bundle 26. Preferably, the steel strands 16 are made of piano wire corresponding to ATSM A 230 and are cold drawn to improve their properties such as tensile strength and elastic modulus. The piano wire nominally has 0.70% to 1.0% carbon therein. The steel filaments 16 may be made from any other material satisfying the desired elongation, cut resistance and cost targets.

Preferably, the array 13 includes steel filaments 16 of a volume constituting 15 to 30% of the total volume of filaments, with steel filaments 16 being of a volume constituting 25% of the total volume of filaments the most preferred.

Each fiberglass strand 20 is composed of a plurality of elongated fiberglass filaments 18 slightly twisted together to have a generally circular cross-sectional configuration. The fiberglass strands 20 each have a diameter of approximately 0.010 inches, which is generally the same as the diameter of each steel filament 16 and generally equal to height of the carbon filament flattened bundle 26.

When the fiberglass filaments 18 are slightly twisted together into fiberglass strands 20, voids (not shown) are created in the volume of each fiberglass strand 20 such that the volume of each fiberglass strand 20 occupied by fiberglass filaments 18 is around 70%. In other words, the total volume of each fiberglass strand 20 is greater than the volume occupied by fiberglass filaments 18 therein.

The fiberglass strands 20 may comprise any number or percentage of fiberglass filaments 18 whereby the total number of fiberglass filaments 18 grouped in each fiberglass strand 20 equals a percentage constituting 0 to 90% of the total volume of filaments.

Preferably, the array 13 includes fiberglass filaments 18 grouped in strands 20 of a volume constituting 5 to 15% of the total volume of filaments, with fiberglass filaments 18 in fiberglass strand 20 being of a volume constituting 10% of the total volume of filaments the most preferred.

In the array 13 of measuring tape 10, any number of carbon filaments 14, steel filaments 16 and fiberglass filaments 18 may used in combination to obtain the preferred percentages described above.

Figure 3:
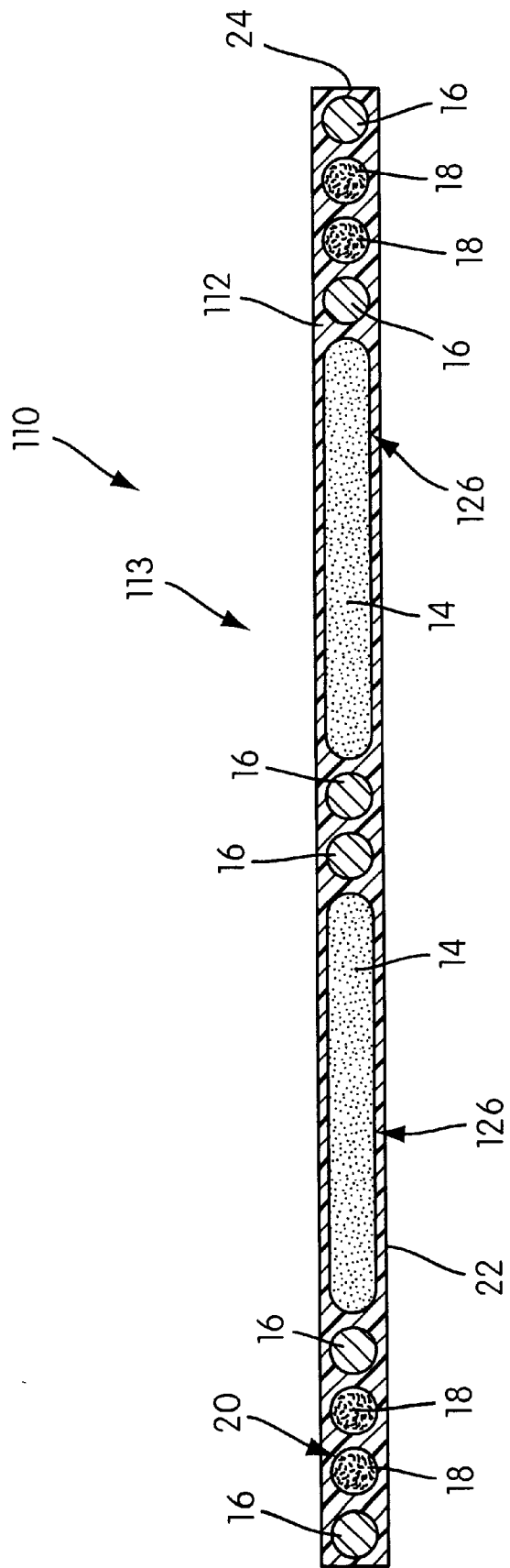
FIG. 3 is a cross section similar to FIG. 2 showing an alternative embodiment of the measuring tape.

FIG. 3 shows a measuring tape 110 as a modification of the measuring tape 10 shown in FIG. 2. The measuring tape 110 comprises an elongated blade 112 of a plastic material reinforced by a transverse array 113 of longitudinally extending continuous filaments. The array 113 of continuous filaments includes grouped carbon filaments 14 of a volume constituting 0 to 90% of the total volume of filaments, steel filaments 16 of a volume constituting 0 to 90% of the total volume of filaments and fiberglass filaments 18 grouped in strands 20 of a volume constituting 0 to 90% of the total volume of filaments.

Preferably, the array 113 includes grouped carbon filaments 14 of a volume constituting 60 to 75% of the total volume of filaments, steel filaments 16 of a volume constituting 15 to 30% of the total volume of filaments and fiberglass filaments 18 grouped in fiberglass strands 20 of a volume constituting 5 to 15% of the total volume of filaments.

Similar to the array 13 in FIG. 2, it is most preferred for the array 113 to include grouped carbon filaments 14 of a volume constituting 65% of the total volume of filaments in the array of filaments, steel filaments 16 of a volume constituting 25% of the total volume of filaments and fiberglass filaments 18 grouped in fiberglass strands 20 of a volume constituting 10% of the total volume of filaments.

The carbon filaments 14 are grouped in a pair of transversely spaced carbon filament flattened bundles 126. Each carbon filament flattened bundle 126 has a transversely elongated generally rectangular cross-sectional configuration. The steel filaments 16 include a plurality of transversely spaced central steel filaments 16 disposed in the space between the pair of carbon filament flattened bundles 126 and a plurality of transversely spaced end steel filaments 16 on opposite sides of the carbon filament flattened bundles 126. The fiberglass strands 20 are disposed in equal number on opposite sides of the pair of carbon filament flattened bundles 126 and the steel filaments 16.

More specifically, two transversely spaced central steel filaments 16 are disposed in the space between the pair of carbon filament flattened bundles 126, two transversely spaced end steel filaments 16 are disposed on opposite sides of the carbon filament flattened bundles 126 and two transversely spaced fiberglass strands 20 are disposed on opposite sides of the two transversely spaced end steel filaments 16.

In the array 113, all of the grouped carbon filaments 14, the steel filaments 16 and the fiberglass filaments 18 are transversely symmetrical.

Preferably, each carbon filament flattened bundle 126 includes about 6,000 slightly twisted carbon filaments 14 flattened to a height substantially equal to the height of the carbon filament flattened bundles 26 shown in FIG. 2. The diameter of each steel filament 16 is generally equal to the height of each carbon filament flattened bundle 126 and is generally the same as the diameter of each fiberglass strand 20.

In the array 113, any number of carbon filaments 14, steel filaments 16 and fiberglass filaments 18 may used in combination to obtain the preferred percentages described above.

Figure 4:
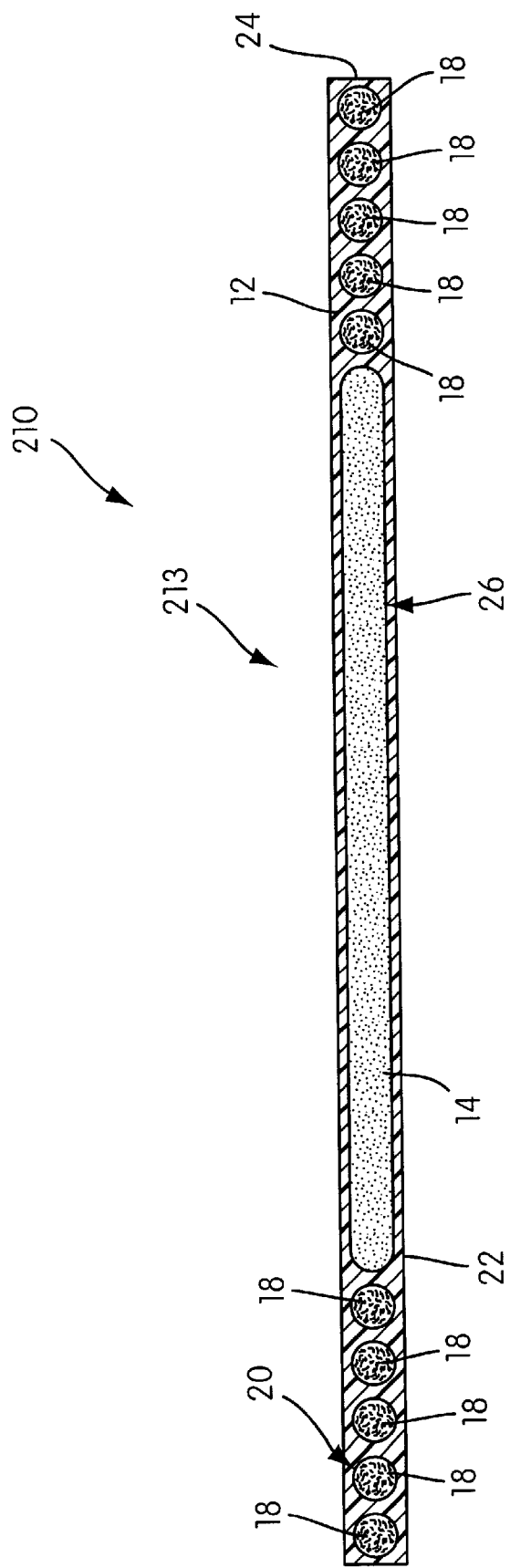
FIG. 4 is a cross section similar to FIG. 2 showing another embodiment of the measuring tape.

FIG. 4 shows a measuring tape 210 as another modification of the measuring tape 10. The measuring tape 210 comprises the elongated blade 12 reinforced by a transverse array 213 of longitudinally extending continuous filaments. The array 213 of continuous filaments includes grouped carbon filaments, 14 of a volume constituting 0 to 90% of the total volume of filaments and fiberglass filaments 18 grouped in strands 20 of a volume constituting 0 to 90% of the total volume of filaments.

Preferably, the array 213 includes grouped carbon filaments 14 of a volume constituting 20 to 80% of the total volume of filaments and fiberglass filaments 18 of a volume constituting 20 to 80% of the total volume of filaments.

Most preferably, the carbon filaments are of a volume constituting 65% of the total volume of filaments and the fiberglass filaments 18 are of a volume constituting 35% of the total volume of filaments.

Similarly to array 13 in FIG. 2, the carbon filaments 14 of array 213 are grouped in the single carbon filament flattened bundle 26 having a transversely elongated generally rectangular cross-sectional configuration. The carbon filament flattened bundle 26 is centrally positioned within the elongated blade 12. The fiberglass strands 20 are disposed in equal number on opposite sides of the carbon filament flattened bundle 26. As shown in FIG. 4, five fiberglass strands 20 are disposed on opposite sides of the carbon filament flattened bundle 26.

In the array 213, all of the grouped carbon filaments 14 and the fiberglass filaments 18 are transversely symmetrical and any number of carbon filaments 14 and fiberglass filaments 18 may used in combination to obtain the preferred percentages described above.

In the broader aspects of this invention, it is contemplated that different amounts of carbon and steel filaments 14, 16, respectively, may be used to increase or decrease the modulus of elasticity and tensile strength of the elongated blade 12. Alternatively, other reinforcement materials such as Kevlar, Spectra, or any other suitable material providing a balance of stretch resistance, cut resistance and cost may be used separately or in conjunction with any combination of carbon filaments 14, steel filaments 16 or fiberglass filaments 18 to create a composite cross section of any configuration. It should be noted that any of these materials may be of single or multiple filaments and the amount of each can be varied to achieve the desired elongation, cut resistance and cost targets.

The measuring tapes 10, 110, 210 can be manufactured to be any length suitable to measure distances of at least 50 feet, however, it is preferred that the measuring tapes 10, 110, 210 are manufactured to be lengths of 50, 100 and 200 feet. The measuring tapes 10, 110, 210 may be manufactured to have any width or thickness suitable for measuring varying distances of at least 50 feet, but a width of from approximately ⅜ inch to approximately ½ inch is preferred.

Referring back to FIG. 1, a long tape, generally indicated at 28, is in the form of an open reel long tape. The long tape 28 comprises a casing 30 having a handle portion 32, a reel member (not shown), an actuating member 34 having an integral crank handle 35 extending therefrom and the measuring tape 10. The reel member is rotatably mounted within the casing 30 for relative movement thereto. The actuating member 34 extends through the exterior of the casing 30 to be received within the reel member for rotatably moving the reel member relative to the casing 30 when a manual force is applied to the integral crank handle 35 extending from the actuating member 34.

The measuring tape 10 is wound around the reel member and having one end 36 thereof extending from the casing 30 and through a tape dispensing slot 38 in the casing 30. The end 36 has an L-shaped workpiece engaging member 40 pivotally mounted thereto. The measuring tape 10 having workpiece engaging member 40 is constructed and arranged to be retractable towards the casing 30 by manual force applied to the crank handle 35.

It is contemplated that the measuring tapes 110, 210 may also be used in long tape 28 in place of measuring tape 10.

OPERATION

The uses of measuring tapes 10, 110 and 210 are not limited to long tapes of the open reel type and may also be used alone, within long tapes of the closed reel type or any other suitable tape measure for carrying measuring tapes of at least 50 feet in length.

The long tape 28 operates in the same manner no matter if measuring tapes 10, 110, or 210 are used therewith. To this end, only the operation of the long tape 28 comprising measuring tape 10 will be described so as not to repeat details.

The workpiece engaging member 40 allows the measuring tape 10 to remain extended in its measuring position by releasably fixing to a workpiece surface. Once a user releasably fixes the workpiece engaging member 40 to a workpiece surface, the handle portion 32 can be pulled away from the workpiece engaging member 40 so that the measuring tape 10 becomes taut. Once taut, additional force on the handle portion 32 causes the handle portion 32 to be moved away from the workpiece engaging member 40, which in turn, causes the measuring tape 10 to unwind from the reel member through the tape dispensing slot 38. Once the measuring tape 10 is unwound, the user may take measurements using the measurement markings 25 printed on the exterior side of the side faces 22.

In some applications, a second user may be needed to hold the workpiece engaging member 40 in his/her hands or against a surface (i.e. the ground or floor) instead of releasably fixing the workpiece engaging member 40 to a workpiece surface. Once the measuring tape 10 is maintained in its measuring position, the measuring tape 10 may be unwound from the reel member through the dispensing slot 38 to make measurements in a similar manner as that described above with only one user. Retracting the measuring tape 10 around the reel member is the same as that described above with only one user. With the tape 10 extended into a measuring position, the users, most likely the user holding the handle portion 32, may make measurements taken at varying length distances of at least 50 feet by reading the measuring markings 25 printed on an exterior surface of tape 10.

After completing their measurements, one of the users rewinds the tape 10 by applying a manual force to the integral crank handle 35 of the actuating member 34. This force causes the actuating member 34 to rotate. The rotation of the actuating member 34 causes the reel member to rotate, which winds the tape 10 around the reel member through the tape dispensing slot 38 in the casing 30. The user can wind the measuring tape 10 around the reel member until the workpiece engaging member 40 abuts or is in close proximity with the tape dispensing slot 38. With the engaging member 40 in this position, the measuring tape 10 is wound around the reel member within the long tape 28. The long tape 28 may be conveniently stored in a toolbox or the like for industrial, commercial or home use.

While the principles of the invention have been made clear in the illustrative embodiments set forth above, it will be obvious to those skilled in the art to make various modifications to the structure, arrangement, proportion, elements, materials, and components used in the practice of the invention.

Any U.S. Patents or patent applications mentioned herein above and not specifically incorporated by reference are hereby incorporated into the present application by reference.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed:

1. A measuring tape comprising:
   an elongated blade of a plastic material reinforced by a transverse array of longitudinally extending continuous filaments,
   said elongated blade having measurement markings on at least one side thereof,
   said array of continuous filaments including at least one bundle of grouped carbon filaments, and at least one of steel filaments and fiberglass filaments grouped in strands,
   wherein the array of continuous filaments forms a total volume of filaments, and
   wherein the at least one bundle of grouped carbon filaments has a volume of up to 90% of the total volume of filaments.

2. A measuring tape according to claim 1, wherein the array of continuous filaments including at least one bundle of grouped carbon filaments, steel filaments and fiberglass filaments grouped in strands, wherein said carbon filaments are of a volume constituting 60 to 75% of the total volume of filaments, said steel filaments being of a volume constituting 15 to 30% of the total volume of filaments and said fiberglass filaments being of a volume constituting 5 to 15% of the total volume of filaments.

3. A measuring tape according to claim 2, wherein said carbon filaments are of a volume constituting 65% of the total volume of filaments, steel filaments being of a volume constituting 25% of the total volume of filaments and said fiberglass filaments being of a volume constituting 10% of the total volume of filaments.

4. A measuring tape according to claim 2, wherein said carbon filaments are grouped in a single flattened bundle having a transversely elongated generally rectangular cross-sectional configuration, said steel filaments including a plurality of transversely spaced steel filaments on opposite sides of said carbon filament flattened bundle, said fiberglass strands being disposed in equal number on opposite sides of said carbon filament flattened bundle, all of said filaments being transversely symmetrical.

5. A measuring tape according to claim 4, wherein said plurality of transversely spaced steel filaments disposed on opposite sides of said carbon filament flattened bundle includes three steel filaments, and the equal number of fiberglass strands disposed on opposite sides of said carbon filament flattened bundle includes two fiberglass strands.

6. A measuring tape according to claim 4, wherein said fiberglass strands are disposed on opposite sides of said plurality of transversely spaced steel filaments and each steel filament has generally the same diameter as each fiberglass strand.

7. A measuring tape according to claim 6, wherein said carbon filament flattened bundle has a height substantially equal to said diameter of each steel filament and each fiberglass strand.

8. A measuring tape according to claim 6, wherein said plastic material is polyvinyl chloride.

9. A measuring tape according to claim 8, wherein said grouped carbon filaments are of a volume constituting about 70% of the total volume occupied by said grouped carbon filaments and said fiberglass filaments being of a volume constituting about 70% of the total volume occupied by said fiberglass strands.

10. A measuring tape according to claim 2, wherein said carbon filaments are grouped in a pair of transversely spaced flattened bundles each having a transversely elongated generally rectangular cross-sectional configuration, said steel filaments including a number of central steel filaments disposed in a space between the pair of carbon filament flattened bundles and a plurality of transversely spaced steel filaments disposed in equal number on opposite sides of said carbon filament flattened bundles, said fiberglass strands being disposed in equal number on opposite sides of said pair of carbon filament flattened bundles, all of said filaments being transversely symmetrical.

11. A measuring tape according to claim 10, wherein said number of central steel filaments includes two steel filaments, the equal number of said plurality of transversely spaced steel filaments disposed on opposite sides of said carbon filament flattened bundles includes two steel filaments, and the equal number of said fiberglass strands disposed on opposite sides of said carbon filament flattened bundles includes two fiberglass strands.

12. A measuring tape according to claim 10, wherein said fiberglass strands are disposed on opposite sides of said plurality of transversely spaced steel filaments and each steel filament has generally the same diameter as each fiberglass strand.

13. A measuring tape according to claim 12, wherein said carbon filament flattened bundles have a height substantially equal to said diameter of each steel filament and each fiberglass strand.

14. A measuring tape according to claim 12, wherein said plastic material is polyvinyl chloride.

15. A measuring tape according to claim 14, wherein said carbon filaments are of a volume constituting about 70% of the total volume occupied by said grouped carbon filaments and said fiberglass filaments being of a volume constituting about 70% of the total volume occupied by said fiberglass strands.

16. A measuring tape according to claim 1, wherein said filaments include said carbon filaments being of a volume constituting 20 to 80% of the total volume of filaments and said fiberglass filaments of a volume constituting 20 to 80% of the total volume of filaments.

17. A measuring tape according to claim 16, wherein said carbon filaments are of a volume constituting 65% of the total volume of filaments and said fiberglass filaments being of a volume constituting 35% of the total volume of filaments.

18. A measuring tape according to claim 17, wherein said carbon filaments are grouped in a single flattened bundle having a transversely elongated generally rectangular cross-sectional configuration, said fiberglass strands being disposed in equal number on opposite sides of said carbon filament flattened bundle, all of said filaments being transversely symmetrical.

19. A measuring tape according to claim 18, wherein said fiberglass strands are disposed in transversely spaced quintuples on opposite sides of said carbon filament flattened bundle.

20. A measuring tape according to claim 19, wherein said grouped carbon filament flattened bundle has a height substantially equal to said diameter of each fiberglass strand.

21. A measuring tape according to claim 19, wherein said plastic material is polyvinyl chloride.

22. A measuring tape according to claim 21, wherein said carbon filaments are of a volume constituting about 70% of the total volume occupied by said grouped carbon filaments and said fiberglass filaments being of a volume constituting about 70% of the total volume occupied by said fiberglass strands.

23. A long tape comprising:

a casing;

a reel member rotatably mounted within said casing for relative movement thereto;

an actuating member accessible on an exterior of said casing for manually moving said reel member relative to said casing and extending through said casing to be received within said reel member rotatably mounted within said casing; and a measuring tape wound around said reel member and having one end thereof extending from said casing configured and arranged to be retractable towards said casing by said actuating member;

said measuring tape comprising:

an elongated blade of a plastic material reinforced by a transverse array of longitudinally extending continuous filaments, said elongated blade having measurement markings on one side thereof, said array of continuous filaments including at least one bundle of grouped carbon filaments, and at least one of steel filaments and fiberglass filaments grouped in strands, wherein the array of continuous filaments forms a total volume of filaments, and wherein the at least one bundle of grouped carbon filaments has a volume of up to 90% of the total volume of filaments.

24. A measuring tape according to claim 23, wherein the array of continuous filaments including at least one bundle of grouped carbon filaments, steel filaments and fiberglass filaments grouped in strands, wherein said carbon filaments are of a volume constituting 60 to 75% of the total volume of filaments, said steel filaments being of a volume constituting 15 to 30% of the total volume of filaments and said fiberglass filaments being of a volume constituting 5 to 15% of the total volume of filaments.

25. A measuring tape according to claim 24, wherein said carbon filaments are of a volume constituting 65% of the total volume of filaments, steel filaments being of a volume constituting 25% of the total volume of filaments and said fiberglass filaments being of a volume constituting 10% of the total volume of filaments.

26. A measuring tape according to claim 24, wherein said carbon filaments are grouped in a single flattened bundle having a transversely elongated generally rectangular cross-sectional configuration, said steel filaments including a plurality of transversely spaced steel filaments on opposite sides of said carbon filament flattened bundle, said fiberglass strands being disposed in equal number on opposite sides of said carbon filament flattened bundle, all of said filaments being transversely symmetrical.

27. A measuring tape according to claim 26, wherein said plurality of transversely spaced steel filaments disposed on opposite sides of said carbon filament flattened bundle includes three steel filaments, and the equal number of fiberglass strands disposed on opposite sides of said carbon filament flattened bundle includes two fiberglass strands.

28. A measuring tape according to claim 26, wherein said fiberglass strands are disposed on opposite sides of said plurality of transversely spaced steel filaments and each steel filament has generally the same diameter as each fiberglass strand.

29. A measuring tape according to claim 28, wherein said carbon filament flattened bundle has a height substantially equal to said diameter of each steel filament and each fiberglass strand.

30. A measuring tape according to claim 28, wherein said plastic material is polyvinyl chloride.

31. A measuring tape according to claim 30, wherein said grouped carbon filaments are of a volume constituting about 70% of the total volume occupied by said grouped carbon filaments and said fiberglass filaments being of a volume constituting about 70% of the total volume occupied by said fiberglass strands.

32. A measuring tape according to claim 24, wherein said carbon filaments are grouped in a pair of transversely spaced flattened bundles each having a transversely elongated generally rectangular cross-sectional configuration, said steel filaments including a number of central steel filaments disposed in a space between the pair of carbon filament flattened bundles and a plurality of transversely spaced steel filaments disposed in equal number on opposite sides of said carbon filament flattened bundles, said fiberglass strands being disposed in equal number on opposite sides of said pair of carbon filament flattened bundles, all of said filaments being transversely symmetrical.

33. A measuring tape according to claim 32, wherein said number of central steel filaments includes two steel filaments, the equal number of said plurality of transversely spaced steel filaments disposed on opposite sides of said carbon filament flattened bundles includes two steel filaments, and the equal number of said fiberglass strands disposed on opposite sides of said carbon filament flattened bundles includes two fiberglass strands.

34. A measuring tape according to claim 32, wherein said fiberglass strands are disposed on opposite sides of said plurality of transversely spaced steel filaments and each steel filament has generally the same diameter as each fiberglass strand.

35. A measuring tape according to claim 34, wherein said carbon filament flattened bundles have a height substantially equal to said diameter of each steel filament and each fiberglass strand.

36. A measuring tape according to claim 34, wherein said plastic material is polyvinyl chloride.

37. A measuring tape according to claim 36, wherein said carbon filaments are of a volume constituting about 70% of the total volume occupied by said grouped carbon filaments and said fiberglass filaments being of a volume constituting about 70% of the total volume occupied by said fiberglass strands.

38. A measuring tape according to claim 23, wherein said filaments include said carbon filaments being of a volume constituting 20 to 80% of the total volume of filaments and said fiberglass filaments of a volume constituting 20 to 80% of the total volume of filaments.

39. A measuring tape according to claim 38, wherein said carbon filaments are of a volume constituting 65% of the total volume of filaments and said fiberglass filaments being of a volume constituting 35% of the total volume of filaments.

40. A measuring tape according to claim 39, wherein said carbon filaments are grouped in a single flattened bundle having a transversely elongated generally rectangular cross-sectional configuration, said fiberglass strands being disposed in equal number on opposite sides of said carbon filament flattened bundle, all of said filaments being transversely symmetrical.

41. A measuring tape according to claim 40, wherein said fiberglass strands are disposed in transversely spaced quintuples on opposite sides of said carbon filament flattened bundle.

42. A measuring tape according to claim 41, wherein said grouped carbon filament flattened bundle has a height substantially equal to said diameter of each fiberglass strand.

43. A measuring tape according to claim 41, wherein said plastic material is polyvinyl chloride.

44. A measuring tape according to claim 43, wherein said carbon filaments are of a volume constituting about 70% of the total volume occupied by said grouped carbon filaments and said fiberglass filaments being of a volume constituting about 70% of the total volume occupied by said fiberglass strands.

* * * * *

UNITED STATES PATENT AND TRADEMARK OFFICE
CERTIFICATE OF CORRECTION

PATENT NO.    : 6,499,226 B1
DATED         : December 31, 2002
INVENTOR(S)   : Reda et al.

It is certified that error appears in the above-identified patent and that said Letters Patent is hereby corrected as shown below:

<u>Title page,</u>
Item [56], References Cited, U.S. PATENT DOCUMENTS, please amend
"5,095,635 A   3/1992    Hassler, Jr. et al. ..........33/771" to read as
-- 5,095,632 A   3/1992    Hassler, Jr. et al. ..........33/493 --.

Signed and Sealed this

Nineteenth Day of August, 2003

JAMES E. ROGAN
*Director of the United States Patent and Trademark Office*